United States Patent
West et al.

(10) Patent No.: US 7,337,286 B1
(45) Date of Patent: *Feb. 26, 2008

(54) STORAGE CONTROL SYSTEM FOR RESTORING A REMOTE DATA COPY

(75) Inventors: Christopher J. West, Boulder, CO (US); David G. Beal, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 287 days.

This patent is subject to a terminal disclaimer.

(21) Appl. No.: 11/106,316

(22) Filed: Apr. 14, 2005

Related U.S. Application Data

(63) Continuation of application No. 09/362,474, filed on Jul. 28, 1999, now Pat. No. 6,912,629.

(51) Int. Cl.
*G06F 13/00* (2006.01)
(52) U.S. Cl. ....................... 711/161; 711/162
(58) Field of Classification Search ................ 711/161, 711/162
See application file for complete search history.

(56) References Cited

U.S. PATENT DOCUMENTS

| 5,155,845 | A | 10/1992 | Beal et al. |
| 5,555,371 | A | 9/1996 | Duyanovich et al. |
| 5,623,599 | A | 4/1997 | Shomler |
| 5,692,155 | A | 11/1997 | Iskiyan et al. |
| 5,835,954 | A | 11/1998 | Duyanovich et al. |
| 6,131,148 | A | 10/2000 | West et al. |
| 6,446,175 | B1* | 9/2002 | West et al. ................. 711/162 |
| 6,725,331 | B1* | 4/2004 | Kedem ....................... 711/117 |
| 6,845,428 | B1* | 1/2005 | Kedem ....................... 711/117 |
| 6,912,629 | B1* | 6/2005 | West et al. ................. 711/161 |

OTHER PUBLICATIONS

Pate, Alison et al.: "RAMAC Virtual Array: Implementing Peer-to-Peer Remote Copy". IBM International Technical Support Organization, Dec. 1998.

* cited by examiner

*Primary Examiner*—Reba I. Elmore
(74) *Attorney, Agent, or Firm*—Brooks Kushman P.C.

(57) ABSTRACT

A method and system for retrieving data that is stored on a backup or secondary storage system located at a remote location to a local storage system. Restoring of backup data involves the transferring of a point-in-time copy of primary system data from a secondary storage system to the local system. The point-in-time copy is created on the secondary system using an asynchronous remote copy scheme. The point-in-time copy that is restored may be either an entire volume or portions thereof.

20 Claims, 4 Drawing Sheets

STORAGE CONTROL SYSTEM FOR RESTORING A REMOTE DATA COPY

CROSS-REFERENCE TO RELATED APPLICATIONS

This application is a continuation of patent application Ser. No. 09/362,474 now U.S. Pat. No. 6,912,629 filed on Jul. 28, 1999, entitled System and Method for Restoring Data from Secondary Volume to Primary Volume in a Data Storage System.

BACKGROUND OF THE INVENTION

1. Field of the Invention

The present invention relates generally to data storage subsystems, and more particularly to methods of retrieving data from a data storage subsystem.

2. Description of Related Art

U.S. patent application Ser. No. 09/274,789, filed Mar. 23, 1999, entitled ASYNCHRONOUS SHADOWING IN DATA STORAGE SUBSYSTEM, applicant, Christopher J. West and U.S. patent application filed concurrently herewith, entitled STORING AND RETRIEVING DATA ON TAPE BACKUP SYSTEM LOCATED AT REMOTE STORAGE SYSTEM SITE, applicant, Christopher J. West, and David G. Beal are specifically incorporated herein by reference for all that they disclose and teach.

In today's competitive business environment, a business must diligently protect its assets, including the data stored within its computer network. Safeguarding corporate data, including engineering designs, pricing information, corporate procedures, customer and vendor lists, and order information, is crucial to the long-term success of a business. Threats to corporate data include hardware failure, physical plant disasters (e.g., building fires, earthquakes, tornadoes, and hurricanes), theft, and industrial sabotage. Protecting corporate data through backup software helps alleviate the downside of these threats and therefore has become an essential part of managing the network environment.

Data storage management methods in modern computer networks tend to vary according to different data characteristics and management issues, such as the amount of the data, cost, performance and fault tolerance. For example, one method of protecting business data is to periodically copy (or "backup") the data to an archive tape for storage at a remote location. Other, more sophisticated solutions involve real-time archival of large amounts of data. Such systems may be generally referred to as "remote copy system", wherein data is recorded fairly contemporaneously to a primary storage medium and a secondary storage medium at another location. Typically, the primary storage medium creates a primary "volume" which represents a set of data information accessible by the primary host application. The secondary storage medium is coupled to the primary storage medium and creates a secondary volume. The primary and secondary volumes form a pair wherein the secondary volume contains the copy of the primary volume.

One implementation of remote copy, called "Peer-to-Peer Remote Copy" or PPRC, provides a synchronous copy, in that an application host system's write operations are propagated to both the primary storage medium and the secondary storage medium at the remote site before the application host system receives an acknowledgment from the storage system indicating that the write operation has completed. In PPRC, the secondary volume is always an exact copy of the primary volume when the pair is duplex.

Another implementation of remote copy, called "Extended Remote Copy" or XRC, provides an "asynchronous copy", in that a write access by an application host system is signaled as complete when the write operation to the primary storage medium completes. The remote copy to the secondary storage medium is performed by a System Data Mover (SDM), a software component executing on a host system (i.e., on the application or primary host system, on the recovery or secondary host system, or on a third host system) having connectivity to both the primary volume and the secondary volume. The SDM periodically copies the data from the primary volume to the secondary volume in the order which the data was originally written to the primary volume.

Periodically copying data from the primary volume to the secondary volume creates a "point-in-time" copy of the data. That is, the information located on the secondary volume is a reflection of the data that was on the primary volume at the time the data was transferred. At a later time, the information on the primary volume may change, and until those changes are propagated to the secondary volume, the point-in-time copy is not identical to the primary volume. In contrast, when two volumes are in duplex under the synchronous PPRC scheme, changes are propagated to the secondary volume as the changes happen, and therefore, the secondary volume is identical to the primary volume at all times.

Yet another implementation of remote copy involves the asynchronous "shadowing" of data between a primary storage controller and a secondary storage controller wherein a snap volume is created by a primary storage controller, the snap volume is used in place of the primary volume to facilitate remote copying instead of the primary volume. Asynchronous shadowing of data provides benefits over the synchronous PPRC in that the host computer is not required to wait for completion of the remote copy process before accessing the primary volume. Additionally, asynchronous shadowing allows the host computer to access the primary volume more readily than in the XRC since the primary volume is not used in copying data to the remote location. The details of asynchronous shadowing and its benefits are described in more detail in the co-pending application referenced above.

With any one of these remote copy implementations, their primary purpose is to provide a copy in case of an emergency or, more particularly, to provide disaster relief wherein the entire computer subsystem or disk array fails or is lost due to a tragic event. As such, the focus of most remote copy systems has been to ensure that the data is properly backed up.

In some situations however, a user of a host computer system desires recovery of backed up data even when the primary storage system and primary host computer are operating properly. In essence, there are times when the data on the primary storage system is not available, for various reasons, such as for example, human error may cause a file to be accidentally deleted or modified. In such a case, the user wants the backup copy of the file or data, if such a backup exists.

If synchronous PPRC is used, then the process of retrieving backup data initially depends on whether a tape backup copy was made, typically by a wholly different tape backup system. That is, since write/modify operations propagate to the secondary system in the PPRC scheme, the secondary system is changed as soon as the primary system is changed. Thus, human errors corrupt the secondary system in the same manner as the errors corrupt the primary system and recovery from the secondary is generally not possible.

Asynchronous remote copy methods and systems on the other hand, while potentially providing a point in time copy, typically do not provide for the transfer of data back to the primary volume from the secondary volume. Recovery operations are typically achieved by copying the data onto a tape medium and transferring or shipping the tape medium back to the primary site. Using the tape medium is labor intensive and time consuming.

It is with respect to these and other considerations that the present invention has been made.

SUMMARY OF THE INVENTION

The present invention provides a method and system of retrieving data that is stored on a secondary storage system located at a remote location to a local storage system. An aspect of the present invention relates to restoring of backup data that is a point-in-time copy of primary system data from a secondary storage system. The point-in-time copy is created using an asynchronous remote copy scheme.

In accordance with these and other aspects, the present invention relates to a storage control system for restoring a remote point-in-time copy of data to a primary volume from a secondary volume wherein the secondary volume provides remote data related to the point-in-time copy stored on at least one remote storage disk. The system comprises a local storage disk and a primary storage controller for conducting a request for the remote point-in-time copy. The system also comprises a secondary storage controller coupled to the primary storage controller to receive the request and to transfer the remote point-in-time copy to the primary storage controller. A local point-in-time copy is created in the primary volume. Preferably, the initial transfer of information from the primary storage controller to the secondary storage system is through an asynchronous remote copy process.

In accordance with other preferred aspects, the present invention relates to a method of restoring data from a secondary storage system to a primary storage system, wherein the secondary system is remotely located from the primary system and the secondary system receives backup data transmissions via a communications link from the primary storage system, the restoring method comprising. The step of the method comprise identifying a valid remote point-in-time copy of the data on the secondary system; requesting the secondary system transmit data associated with the remote point-in-time copy; transmitting the data associated with the point-in-time copy from the secondary system to the primary system; and configuring the primary system to access the transmitted data. Additionally, the method preferably comprises the step of asynchronously conducting data transmissions between the primary and secondary storage systems. Moreover, the method of restoring data relates to restoring data which is either point-in-time copy related to portions of a volume or a complete volume.

The present invention also relates to a program storage medium, readable by a computer, tangibly embodying a program of instructions executable by said computer for restoring a point-in-time copy of computer readable data to a local storage system having at least one local storage disk from a remote storage system having at least one remote storage disk. The program comprises instructions for identifying a valid point-in-time copy present on the remote storage disk; requesting the point-in-time copy to be transferred from the remote storage system to the local storage system; transferring the point-in-time copy to the local storage system; and storing the point-in-time copy to the local storage disk.

These and various other features as well as advantages which characterize the present invention will be apparent from a reading of the following detailed description and a review of the associated drawings.

DETAILED DESCRIPTION OF THE PREFERRED EMBODIMENT

Embodiments of the invention described herein are generally implemented as logical operations in an intelligent controller in a storage control system. The logical operations of the present invention are implemented (1) as a sequence of operations directed by program instructions running on an intelligent controller, and (2) as interconnected machine or circuit modules within the intelligent controller. The implementation is a matter of choice, dependent on the performance requirements of the intelligent controller implementing the invention. Accordingly, the logical operations making up embodiments of the present invention described herein are referred to variously as operations, steps, and modules.

Figure 1:
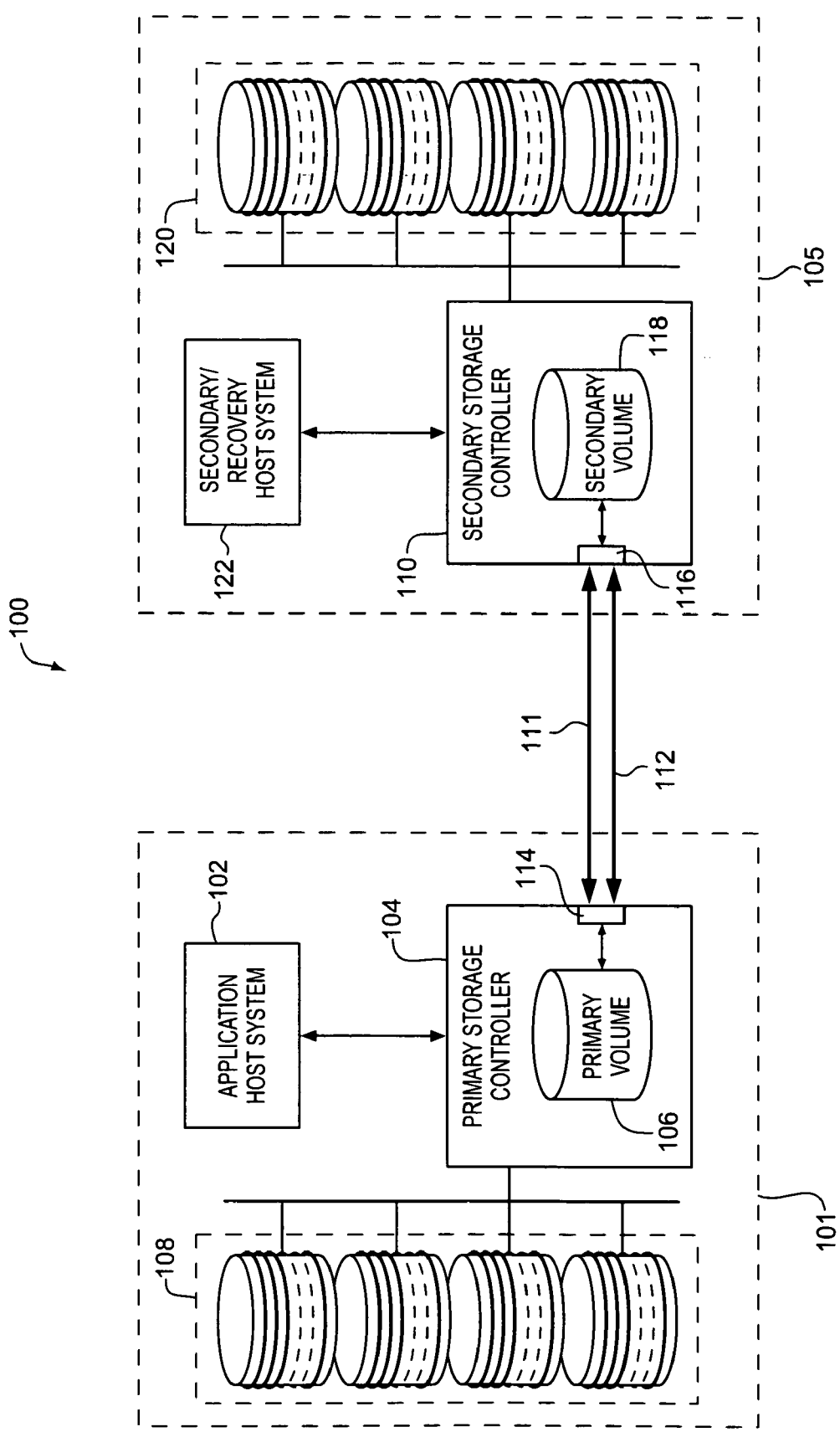
FIG. 1 is a block diagram of a host system and a storage controller in an embodiment of the present invention.

A computer storage system 100 incorporating an embodiment of the present invention is shown in FIG. 1. The computer system 100 incorporates a local or primary computer system 101 and a remote or secondary storage subsystem 105. The secondary system 105 receives copies of data stored on the primary system 101 and stores the data in case of an emergency. The data at the secondary system is a "point-in-time" copy of the information stored locally on the primary system 101. The secondary system 105 is capable of transmitting a copy of the point-in-time information stored on the secondary system 105 to the primary system 101 when requested by the primary system 101.

As shown in FIG. 1, the primary system 101 incorporates an application host system 102, a primary storage controller 104 and a primary disk array 108. Additionally, the system 101 is preferably a server computer system in a client/server environment wherein the application host system performs a significant amount of processing for at least one client computer (e.g., a personal computer or workstation) coupled to it. Alternatively, the application host system 102 may include a personal computer system, a mainframe computer system, or a minicomputer system. The application host system 102 executes an application that must access large amounts of data controlled by the primary storage controller 104. The application host system 102 periodically reads from and writes to the primary storage controller 104 in accordance with program instructions provided by the application and associated system drivers. A microprocessor (not shown) in the application host system 102 executes the program instructions that are typically stored in a storage medium accessible by the application host system 102. The storage medium can include, without limitation, host memory or a local storage disk.

The primary storage controller 104 comprises internal memory for recording virtual disk volumes, such as a primary volume 106, that are mapped to local data stored on physical storage disks in a disk array, such as disk array 108. The primary volume 106 presents to the application host system 102 a virtual disk from which the application host system 102 can read data and write data as though it were accessing a physical disk drive. The primary volume 106 provides a logical interface to the data stored in the disk array 108, regardless of where the data is physically stored within a disk array. For example, it is common to allocate a storage track of the primary volume across multiple disks in the disk array 108, using a technique called "striping." As a result, the application host system 102 accesses the primary volume 106 as a continuous disk volume, while the data is physically distributed throughout the disk array 108. Preferably, the storage controller 104 supports multiple volumes associated with the disk array 108.

The primary storage controller 104 is coupled to a secondary storage controller 110 of the secondary system 105 via two bi-directional links 111 and 112. The links 111 and 112 each comprise at least one fiber-optic cable, such as Enterprise Systems CONnectivity™ (ESCON) connections defined by IBM Corporation. The primary storage controller 104 includes a communication port 114 and the secondary storage controller 110 includes a communications port 116. The ports 114 and 116 are coupled to the links 111 and 112 to provide inter-controller communications. Commands produced by the primary storage controller 110 or the data of the primary volume 106 can be communicated to a secondary volume 118 associated with the secondary controller 110 through either link 111 or 112 to the secondary storage controller 110. The secondary volume 118 represents a virtual disk of remote data stored in the secondary disk array 120. Preferably, a recovery or secondary host system 122 is coupled to the secondary storage controller 110 to provide high level control and management of the secondary system 105.

In accordance with the present invention the secondary system receives copies of data information from the primary controller 104 and stores the data on the secondary disk array 120. The information is transferred asynchronously and therefore the copy on the secondary disk array 120 is a point in time copy of the data on the primary disk array 108. The secondary controller 110, when requested, transfers data stored on the secondary disk array 120 to the primary disk array 108 through the primary storage controller 104 via either link 111 or 112.

The links 111 and 112 are used to transfer the data back and forth between the two storage controllers 104 and 110. Additionally, the links 111 and 112 facilitate the transfer of commands and requests from the primary host computer 102 and primary storage controller to the secondary host computer 120 and secondary storage controller. Preferably, the request for the data is conducted from the primary storage controller 104 to the secondary controller 110 via link 111 and the data is transferred back to the primary storage controller 104 via link 112 to reduce the traffic on one link. In alternative embodiments (not shown), only one bi-directional link is used for all data and command transfers or two uni-directional links are used to transfer data and commands.

Figure 2:
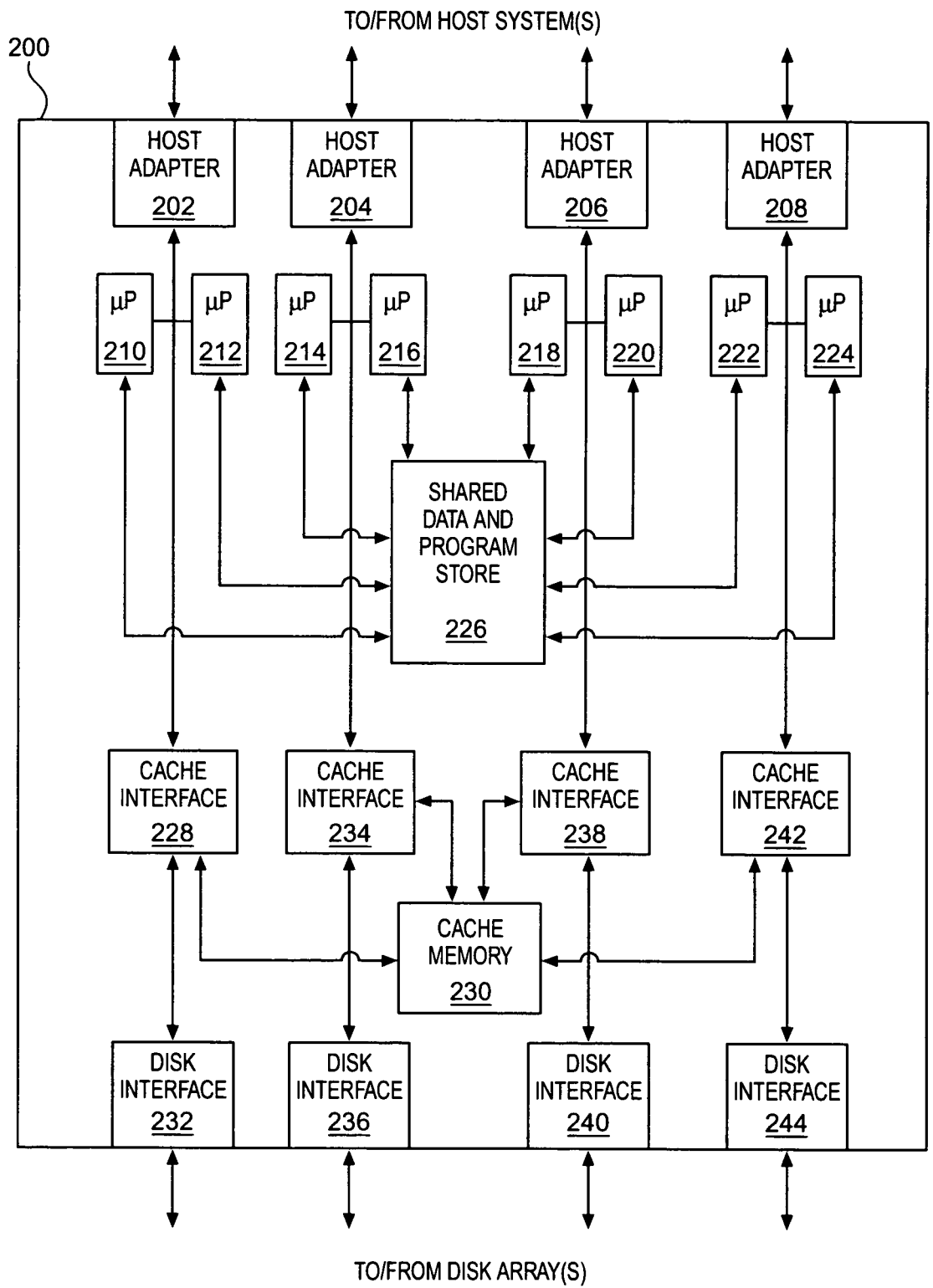
FIG. 2 is a block diagram of a storage controller in an embodiment of the present invention.

FIG. 2 depicts a block diagram of an exemplary storage controller 200, such as 104 and 110 shown in FIG. 1. The storage controller 200 includes host adapters 202, 204, 206, and 208. The host adapters are coupled to host systems, such as the application host system 102 and the recovery host system 122 (FIG. 1) or to the links 111 and 112. Microprocessors 210 and 212 process data communicated through the host adapter 202 in accordance with program instructions stored in a shared data and program store 226. In an alternative embodiment, each microprocessor is coupled to an individual memory device including program instructions and data. Preferably, the program instructions are downloaded to the shared data and program store 226 by a support processor (not shown). The shared data and program store 226 (alternatively referred to as shared memory) stores the logical representation (e.g., pointers) of at least one virtual disk volume controlled by the controller 200. The data communicated through host adapter 202 is also communicated through a cache interface 228 to cache memory 230 or to a disk interface 232. The disk interface 232 communicates data to and from the cache interface 228 to a disk array (not shown) such as disk array 108 or 120 (FIG. 1). In a preferred embodiment of the present invention, the disk interface 232 is a communications port, such as an ESCON port, to a fiber-optic cable.

A second set of components includes the host adapter 204, microprocessors 214 and 216, a cache interface 234 and a disk interface 236. Another set of components includes the host adapter 206, microprocessors 218 and 220, a cache interface 238, and a disk interface 240. Yet another set of components includes the host adapter 208, microprocessors 222 and 224, a cache interface 242 and a disk interface 244. It is to be understood that data from one host adapter can be communicated through any disk interface in the storage controller. Likewise, it is to be understood that data from a disk interface can be communicated through any host adapter in the storage controller. Furthermore, a virtual disk volume defined in the cache memory 230 can be accessed through any host adapter in the storage controller 200 and can logically map to any disk in any disk array coupled through the disk interfaces 232, 236, 240 and 244. Through this flexibility, the storage controller 200 and associated applications provides a powerful means of managing large amounts of storage. In effect, the complicated distribution of physical storage is abstracted and presented to an application as a virtual disk volume. In this manner, the configuration of physical storage is essentially irrelevant because the virtual disk provides a consistent interface for applications that access the volume.

Referring back to FIG. 1, the primary storage controller 104 creates the primary volume 106, which maps data stored in the disk array 108. The host system 102 is coupled to the primary storage controller 104 to access data represented by the primary volume 106. The host system 102 configures the primary storage controller 104 to perform asynchronous copying of data written to the primary volume 106 to remotely copy data to the secondary storage controller 110. In order to achieve this function, the host 102 establishes a peer to peer connection between volumes 106 and 118, on command or on predetermined periodic intervals, and conducts control signals to the primary storage controller instructing the transmission of data to the secondary storage controller 110. The secondary storage controller 110 receives the data and facilitates the storage of the data on the secondary disk array 120. Additionally, the secondary volume 118 is maintained to provide a mapping of the physical location information of the corresponding data on the secondary disk array 120. Preferably each volume located in the primary storage controller corresponds to a volume on the secondary storage controller, wherein the two corresponding volumes are referred to as a pair.

In a preferred embodiment, the data is asynchronously transmitted to the secondary system 105 so that the point-in-time copy is identifiable. Information related to which volume was transferred to the remote location and the time of the transfer is stored in the shared data and program store, (such as 226 in FIG. 2) of the primary storage controller. The time intervals used for transferring the data to the remote location is preferably configurable and thus determinable by the user of the host system 102.

Figure 3:
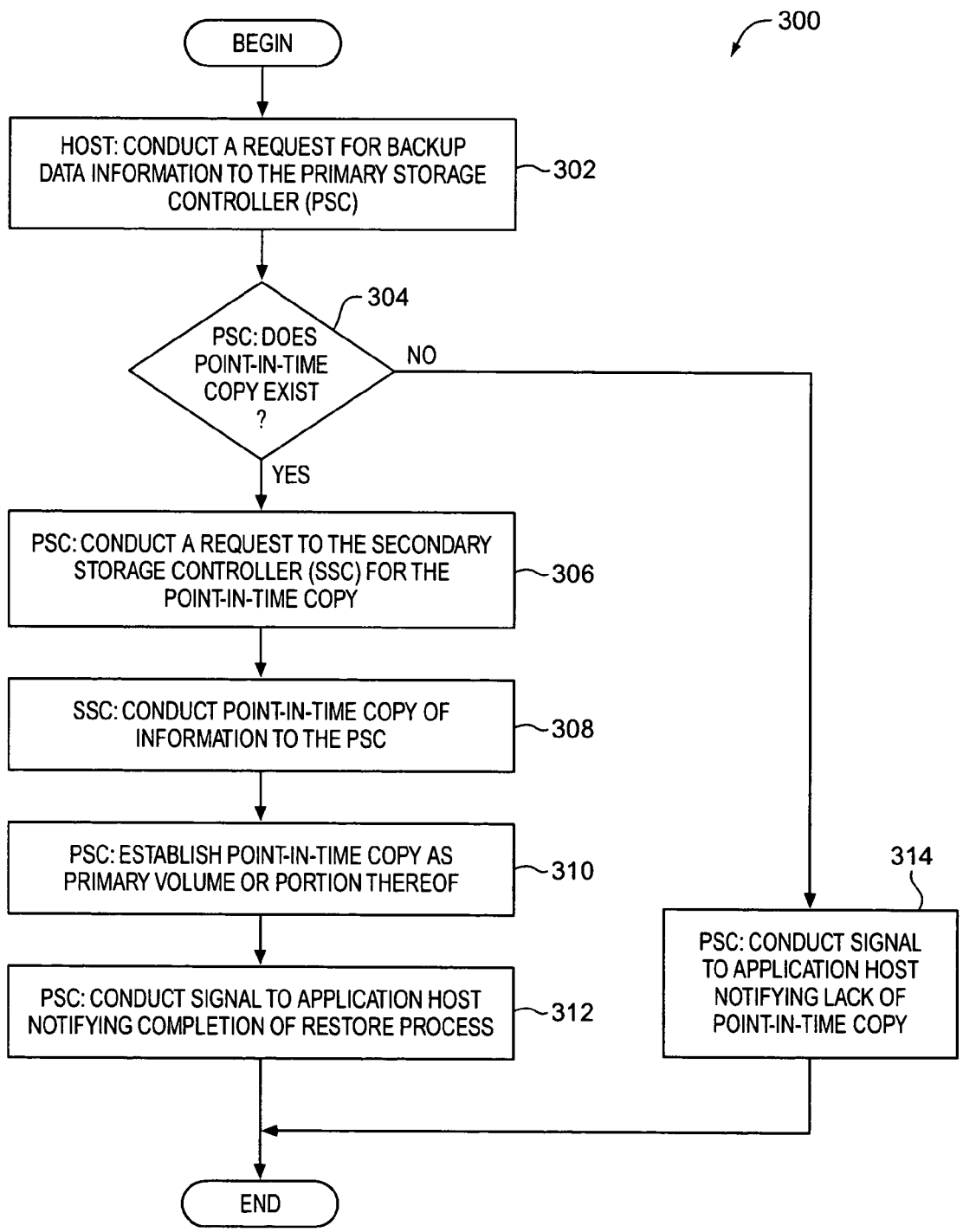
FIG. 3 is a flowchart of operations for performing an asynchronous shadowing operation in an embodiment of the present invention.

The operations for performing retrieval process 300 in order to recover data from the secondary system 105 according to the present invention are shown in FIG. 3. Initially, conduct operation 302 conducts a request from the application host system 102 (FIG. 1) to the primary storage controller 104. As shown, this operation is preferably initiated by the host system 102 and is generally the result of some sort of error recognized either by the user of the host system 102 or by the host system microprocessor (not shown). Alternatively, the conduct operation 302 may be initiated by a microprocessor in the primary storage controller 104 due to a recognized error condition or the signal could by initiated by some other component in the system 100 (FIG. 1).

The request conducted by operation 302 includes sufficient information enabling the primary storage controller 104 to uniquely and unambiguously determine whether a satisfactory remote point-in-time copy exists. The request comprises information related to which volume is to be recovered and preferably includes time and date information related which point in time copy is requested.

Upon receipt of the request for backup data information from the host 102, as conducted by conduct operation 302, determination step 304 determines whether or not a valid or satisfactory remote point-in-time copy exists. The determination is done by the primary storage controller. More particularly, the primary storage controller executes a routine using its microprocessors such as e.g., 210, 212, 214, 216, 219, 220, 222 and 224 (FIG. 2), to determine if and when the last asynchronous remote copy occurred for the particular volume requested. In the preferred method, this type of information is stored in the shared program and data store 226 (FIG. 2) but may also be stored in the cache memory and comprises only the necessary information to uniquely and unambiguously identify remote copy volumes and when such a remote copy was transmitted to the secondary system 105. The information can be stored as a lookup table if the asynchronous scheme is based on volumes. Otherwise, a time stamp may be sufficient. The primary storage controller 104 therefore need only compare the request information related to time and date of the backup information to its information within the memory related to the last time the particular volume was backed up to determine if a valid point-in time copy exists.

If a remote point-in-time copy exists that satisfies the request, flow branches YES to conduct operation 306, as shown in FIG. 3. Conduct operation 306 conducts a request from the primary storage controller 104 to the secondary storage controller 110 for the point-in-time copy. Since the point-in-time copy exists, as determined by the primary storage controller 104 at operation 304, the primary storage controller 104 simply conducts a request to the secondary controller 110 requesting that secondary storage controller 110 return the point-in-time copy. The request signal is conducted along link 111 (FIG. 1) and is received at the secondary storage controller 110 through the interface 116 (e.g., 208 in FIG. 2), wherein the microprocessors associated with the secondary storage controller 110 recognize this type of request. Preferably, the requests are sent from the primary storage controller 104 to the secondary storage controller 110 using the ESCON interface protocol. The request identifies the volume and preferably time and date information. However, time and date information may not be necessary since the only copy at the secondary is most likely the desired point-in-time copy. Conducting the information, however, allows the secondary controller 110 to reaffirm the existence of a valid point-in-time copy, if desired.

Following receipt of the request for the point-in-time copy, return operation 308 returns the point-in-time copy requested by the primary storage controller from the secondary storage controller to the primary storage controller. Operation 308 is controlled by the primary storage controller in a preferred embodiment wherein the primary storage controller 104 has significant control over the secondary storage controller and the volumes within the secondary storage controller. Therefore, the primary storage controller 104 uses the ESCON interface protocol to relatively directly control the retrieval of the point-in-time copy.

The data transfer is handled in the same manner as the data transfers from the primary to the secondary system 105 during normal asynchronous backup procedures. However, the data is transmitted in the opposite direction and uses the link 112. The secondary system 105 is the transmitting system and the primary system 101 is the receiving system. In conducting the point-in-time copy from the secondary storage controller 110 to the primary storage controller 104, the data information is copied to the disk array 108, through primary storage controller 104 in the same manner as data is copied to disk array 120 during normal remote copying. The data transfer creates a local point-in-time copy that is the same as the remote point-in-time copy. In the preferred embodiment of the present invention, the information overwrites the existing data associated with the primary volume and thus the primary volume maintains some of its original memory mapping or physical location information. Alternatively the information is copied to different, physical portions within the disk array 108, setting up within the primary storage controller a temporary volume.

In the preferred embodiment, the request, conducted by the primary storage controller at 306 includes sufficient information related to the eventual physical location on the primary storage medium 108 enabling the data transfer to be conducted relatively directly to the predetermined location. Therefore, once the point-in-time copy has been stored within the disk array 108, in the location requested by the primary storage controller 104 and host application system 102, operation 310 establishes the primary volume as having the information for the data received from the secondary storage controller 110. If only a portion of the volume is transferred, then a portion of the primary volume is established as the local point-in-time copy. This step may merely involve the receipt of a transfer complete control signal from the secondary storage controller 110.

In an alternative embodiment, the process step of transferring the data to the primary storage controller 104 does not transfer the data to a predetermined location on the primary storage array 108. Therefore, operation 310, upon receipt of the transfer complete control signal form the secondary storage controller 110, either updates the primary volume with the local point-in-time copy information or in yet another alternative embodiment, replaces the whole primary volume with a temporary volume set up during the transfer. Either way, operation 310 causes the primary volume to include the proper information related to the local point-in-time copy information.

Once the primary volume comprises the local point-in-time copy information, conduct operation 312 conducts a signal to the application host notifying completion of the restore process 300. The signal may automatically be conducted to the application host upon replacement of the primary volume, or such a signal may be delivered upon some other command or request. However, the host system 102 does not have access to the primary volume until receipt of this completion signal. Therefore it is preferable to automatically conduct the completion signal to the host notifying the host that it can access the primary storage controller.

Upon receipt of the completion signal by the host system 102, the restoration process 300 is complete.

If determination step 304 determines that a valid point-in-time copy does not exist, conduct operation 314 conducts a signal to the application host 102 notifying the application host 102 that no point-in-time copy exists. The restore process ends following the conduction of this signal as there is no reason to communicate with the secondary storage controller 110 for a copy that does not satisfy the initial request.

In alternative embodiments the information related to the point-in-time copies may be stored at the secondary storage controller. In such an alternative embodiment, the determination step 304 is generally carried out by the secondary storage controller 110 instead of the primary storage controller 104 as shown in FIG. 3. The signal related to the absence of a point-in-time copy would be conducted from the secondary storage controller 110 to the primary storage controller 104 which would then relay the information to the application host system 102.

Partial volumes, extent levels of volumes, full volumes or other variations of identifiable memory locations can be restored according to process 300. In order to restore partial volumes, bit map information is sent to the secondary storage controller from the primary storage controller in its request for the point-in-time copy. The bit map information relates to the precise data or portions of data that is to be restored. The secondary storage controller correlates the bit map information to actual data located on the secondary disk array. Since the location of data on the secondary disk array is not necessarily the same as the location of the corresponding data on the primary disk array, some translation may be necessary. Since the secondary volume keeps track of corresponding data locations, the translation is relatively straightforward. Moreover, the bit map of information may actually relate to data from more than one volume.

An extent level is related to a set of tracks that is to be restored. Sets or ranges of physical tracks are identifiable and therefore can be restored as such. The process of restoring a partial volume using extent information is the same as restoring using a bit map, except the process uses a start address and a count value to define a range of tracks to be copies instead of a bit representation of each track to be copied. In an alternative embodiment the tracks that are restored may actually comprise information from more than one volume.

If the full volume is to be recovered then merely a volume identification is conducted with the request. The secondary controller transfers a whole volume of information when receiving only the volume identification.

Figure 4:
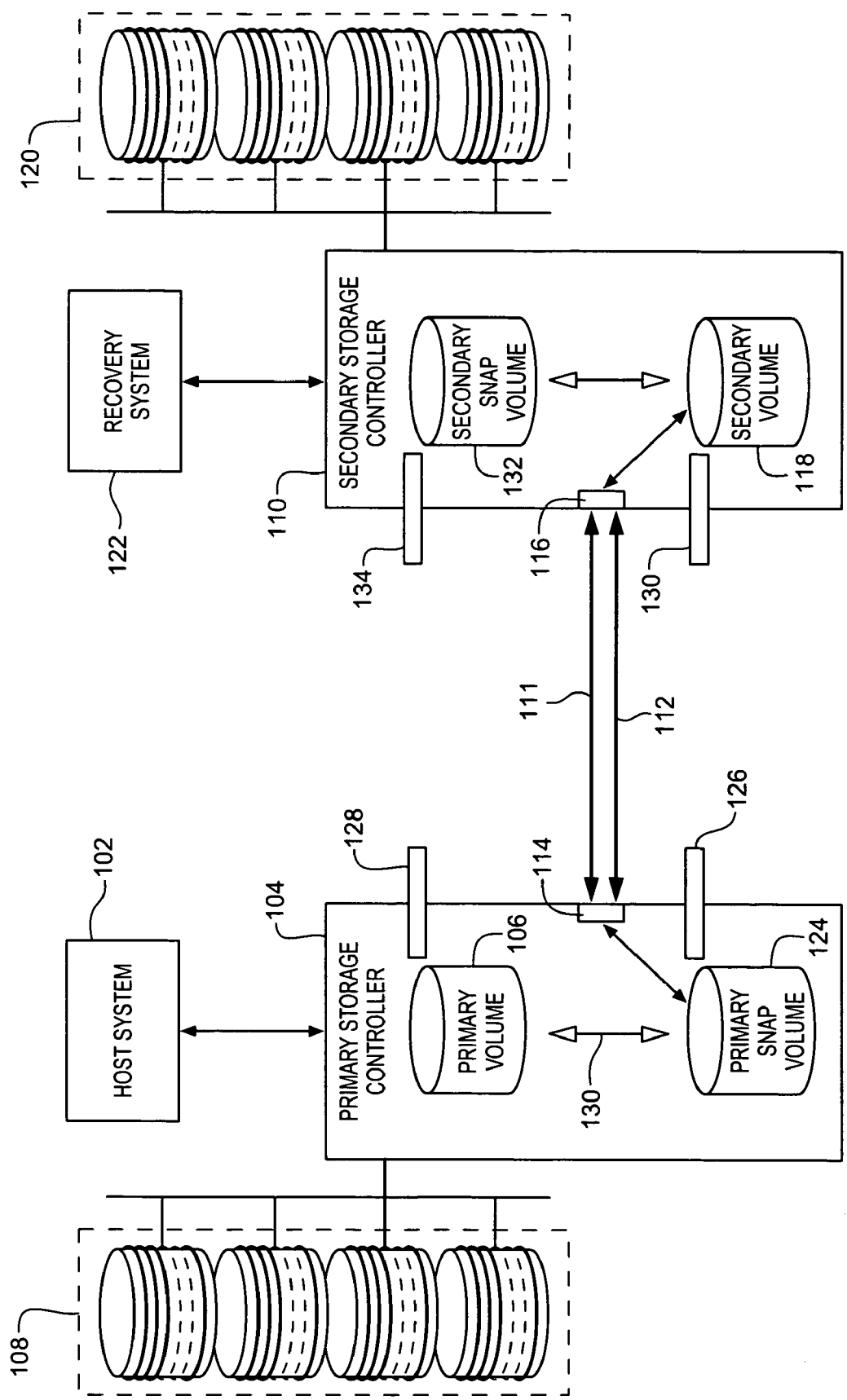
FIG. 4 is a block diagram of a preferred embodiment of the present invention.

A block diagram illustrating computer system 100 in accordance with the preferred embodiment of the present invention is shown in FIG. 4. The primary storage controller 104 uses a "snap" volume 124 to facilitate asynchronous remote copying. The snap volume 124 is a copy of the primary volume 106 and therefore virtually maps to the same data location as the primary volume 106. The snap volume 124 is then used to transfer data to the secondary controller 110, freeing the primary volume to be accessible to the host system 102.

The primary storage controller 104 is triggered to "snap" information to the snap volume 124 those cylinders of the primary volume 106 that are out-of-sync with the secondary volume 118. In the first instance, all cylinders of the primary volume 106 are out-of-sync with the secondary volume 118, and therefore all populated cylinders of the primary volume 106 are snapped to the snap volume 124. "Snapping" is a process by which the pointers that represent the mapping of a primary volume to the physical storage in a disk array 108 are copied from shared memory associated with the primary volume 106 to shared memory associated with a snap volume 124. In contrast to a remote copy of physical data from a primary disk array 108 to a secondary disk array 120, a snap operation does not involve the copy of physical data from the primary disk array and, therefore, occurs relatively rapidly. In this manner, no actual data is copied to the snap volume, just pointers are copied. A bit map structure 126 is associated with the snap volume 124 to indicate those cylinders of the snap volume 124 that are out-of-sync with the secondary volume 118. After the out-of-sync cylinders are snapped, the bit fields in bit map structure, i.e., the bit map structure associated with primary volume 106 are reset and a write complete status is sent back to the application host system. The arrow 130 represents the copy operation (i.e., the snap) of the pointers from the primary volume 106 to the snap volume 124.

The communications link 111 communicates a physical copy of the data stored in the disk array 108 and mapped by the snap volume 124 to the secondary volume 118. In contrast to the snap operation represented by arrow 130, the remote copy from the snap volume 124 to the secondary volume 118 comprises an actual copy of data, which is physically recorded to the disk array 120. In a preferred embodiment, a remote copy pair is configured between the primary volume 106 and the secondary volume 118 to perform remote copying. Furthermore, the snap volume 124 is configured as a target volume for the snapping operation, as an intermediate stage of the remote copying operation. Since the process is asynchronous, a point-in-time copy exists at the secondary system. This point-in-time is representative of the backup desired. In order to retrieve the point-in-time copy the host computer must send a request to the secondary subsystem through link 111.

In operation the method of restoring backup information from the secondary storage controller shown in FIG. 4 is similar to the steps shown in FIG. 3. However, during the conduction of the point-in-time copy of information to the primary storage controller at operation 308, the point-in-time copy is conducted from the secondary volume to the primary snap volume, the primary snap volume may be deemed a temporary volume as described above. In essence this primary snap volume is replaced at step 310 and becomes the primary volume following the transfer of data. Once the restore process 300 is complete, a new snap volume may be created and conducted to the secondary storage controller on an asynchronous basis.

The computer system 100 and method described above for restoring a valid point-in-time copy from the secondary system 105 to the primary system 101 eliminates the time consuming task of recovering data from a tape backup system. As long as a valid point-in-time copy exists, then the process of creating the point-in-time copy may be of little significance. Importantly, the system can identify the existence of the point-in-time copy and restore that copy to the primary system 101. The simplicity of the above method allows the restoration process to be exploited relatively often with minimal impact on the host application 102.

The above specification, examples and data provide a complete description of the manufacture and use of the composition of the invention. Since many embodiments of the invention can be made without departing from the spirit and scope of the invention, the invention is defined by the following claims.

What is claimed is:

1. A storage control system for restoring a remote point-in-time copy of data to a primary system comprising a plurality of primary volumes from a secondary system comprising a plurality of secondary volumes, said secondary system adapted to provide information of remote data stored on at least one remote storage disk, the system comprising:
    at least one local storage disk;
    a primary storage controller that conducts a request for the remote point-in-time copy; and
    a secondary storage controller coupled to the primary storage controller to receive the request from the primary storage controller and to transfer the remote point-in-time copy from the secondary storage controller to the primary storage controller thereby creating a local point-in-time copy,
    the remote point-in-time copy comprising data from more than one of the plurality of the secondary volumes.

2. A storage control system as defined in claim 1 wherein the secondary storage system receives the point-in-time copy through an asynchronous remote copy process.

3. A storage control system as defined in claim 1, wherein the primary storage controller further comprises an intermediate volume to facilitate the asynchronous remote copy process by storing the local point-in-time copy prior to the local point-in-time copy being restored to the primary volumes.

4. A storage control system as defined in claim 1 further comprising a secondary host system coupled to the secondary storage controller.

5. A storage control system as defined in claim 1 wherein the secondary system is remotely located from the primary system.

6. A storage control system as defined in claim 1, wherein the primary storage controller further comprises memory identifying remote copy occurrences by any of a volume identifier and a time.

7. A storage control system as defined in claim 6 further comprising an application host system coupled to the primary storage controller, wherein the identified remote copy occurrences are used by the primary storage controller to determine whether a valid remote point-in-time copy exists in response to a request by the application host system.

8. A storage control system as defined in claim 1, wherein only predetermined portions of the plurality of secondary volumes are included in the remote point-in-time copy transferred to the primary system.

9. A storage control system as defined in claim 8 wherein the system further comprises:
    a bit map data structure associated with the plurality of primary volumes, the bit map structure identifying physical portions of at least two primary volumes; and
    the request for point-in-time copy comprises information related to the bit map structure.

10. A storage control system as defined in claim 8 wherein the system further comprises extent levels associated with the plurality of primary volumes, the extent levels identifying physical portions of at least two primary volumes; wherein the request for point-in-time copy comprises information related to the extent levels.

11. A method of restoring data from a secondary storage system to a primary storage system, wherein the secondary storage system is remotely located from the primary storage system and the secondary storage system receives backup data transmissions via a communications link from the primary storage system, the restoring method comprising:
    identifying a valid remote point-in-time copy of the data on the secondary storage system, wherein the valid point-in-time copy comprises data from a plurality of secondary volumes associated with the secondary storage system;
    requesting the secondary storage system transmit data associated with the remote point-in-time copy;
    transmitting the data associated with the point-in-time copy from the secondary storage system to the primary storage system; and
    configuring the primary storage system to access the transmitted data.

12. A method of restoring data as defined in claim 11 wherein the data is on a secondary disk array.

13. A method of restoring data as defined in claim 11, wherein the point-in-time copy comprises selected portions of more than one of the secondary volumes.

14. A method of restoring data as defined in claim 11 further comprising using a bit map data structure to identify physical portions of at least two primary volumes to be partially restored.

15. The method of claim 11, further comprising using extent levels associated with a plurality of primary volumes associated with the primary storage system, the extent levels identifying physical portions of at least two primary volumes, wherein the request for point-in-time copy comprises information related to the extent levels.

16. A method of restoring data as defined in claim 11 wherein backup data transmissions conducted from the primary storage system to the secondary storage system comprise asynchronous data transmissions.

17. A method of restoring data as defined in claim 16, wherein the primary storage system comprises a snap volume, said method further comprising the following step:
    asynchronously transmitting backup copies of data from the primary storage system to the secondary storage system using the snap volume.

18. A method of restoring data as defined in claim 17 wherein the secondary storage system comprises a secondary snap volume, said method further comprising the following step:
    asynchronously transmitting the point-in-time backup copy from the secondary storage system to the primary storage system using the secondary snap volume.

19. A program storage medium, readable by a computer, tangibly embodying a program of instructions executable by said computer for restoring a point-in-time copy of computer readable data to a local storage system having at least one local storage disk from a remote storage system having at least one remote storage disk, the program comprising instructions for:
    identifying a valid point-in-time copy present on the remote storage disk;
    requesting the point-in-time copy to be transferred to the local storage system;

transferring the point-in-time copy to the local storage system; and storing the point-in-time copy to the local storage disk, wherein the point-in-time copy comprises data from a plurality of secondary volumes associated with the secondary system.

20. A program storage medium as defined in claim 19 wherein data from only selected portions of the plurality of secondary volumes are included in the remote point-in-time copy transferred to the local storage system.

* * * * *